Feb. 25, 1930. B. N. CARLSON 1,748,830
MATERIAL RECEPTACLE AND SIFTER
Filed Sept. 11, 1929
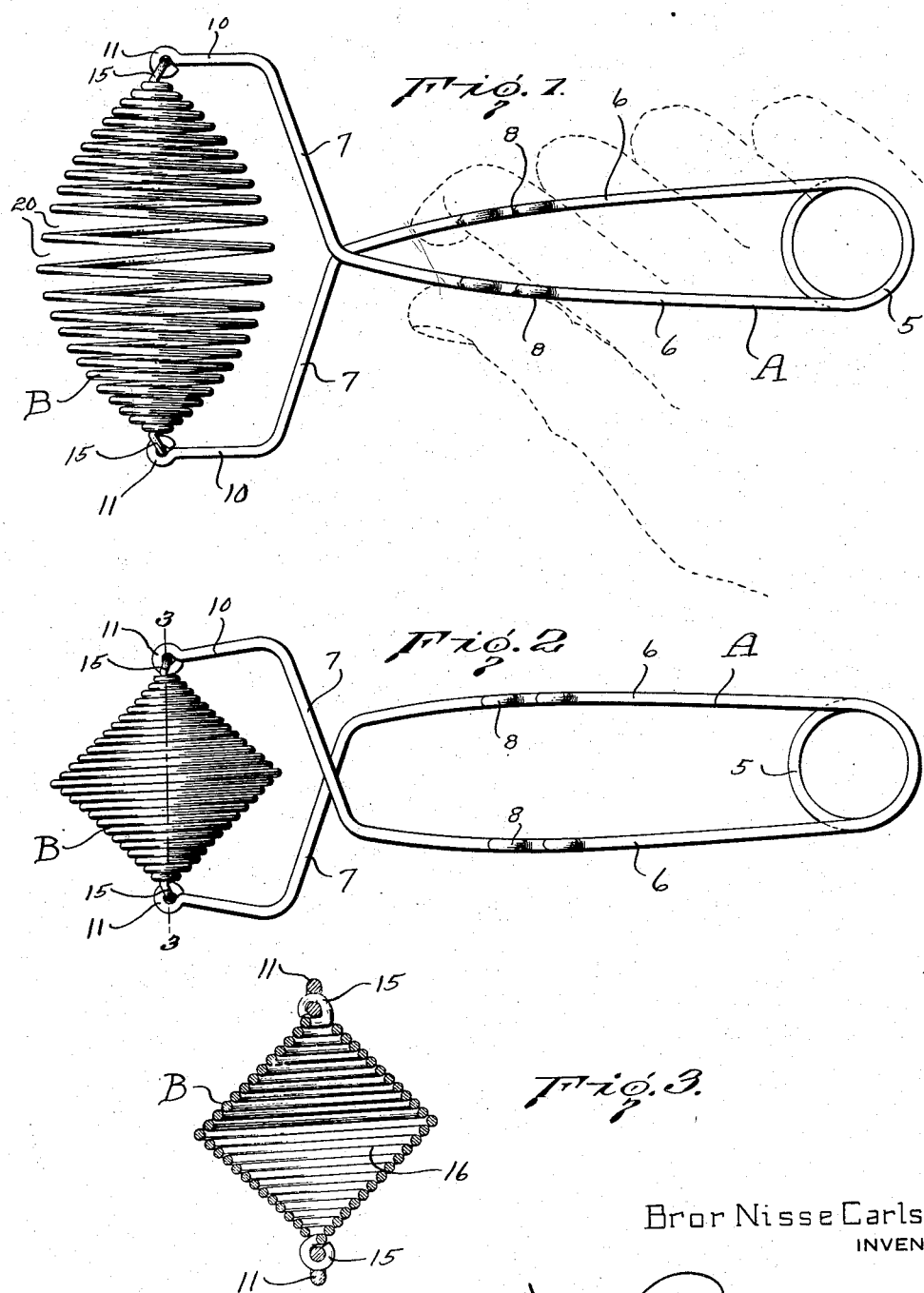
Bror Nisse Carlson
INVENTOR.

Patented Feb. 25, 1930

1,748,830

UNITED STATES PATENT OFFICE

BROR N. CARLSON, OF ROCKFORD, ILLINOIS

MATERIAL RECEPTACLE AND SIFTER

Application filed September 11, 1929. Serial No. 391,863.

The present invention relates primarily to cooking utensils, and the primary object of the invention is to provide a combined material receptacle and sifter for use in handling flour and like ingredients.

A further object of the invention is to provide an improved cooking utensil adapted for use in sifting small amounts of flour and other ingredients of a similar nature into gravies, batters and like dishes where it is desirable to add the ingredients gradually so as to prevent lumping.

A further object of the invention is to provide an improved combined measuring and sifting device whereby measured quantities of pulverized materials may be readily removed from a receptacle and either sifted or deposited in bulk as desired.

A still further object of the invention is to provide a combined measuring and sifting device embodying a contractable receptacle adapted to be extended to various degrees for regulating the escape of material from the receptacle.

Other objects and advantages of the invention will be apparent during the course of the following detailed description, taken in connection with the accompanying drawing forming a part of this specification and in which drawing:

Figure 1 is a plan view of the combined measuring and sifting device and showing the receptacle extended for allowing filling or emptying of the receptacle.

Figure 2 is a plan view of the device showing the receptacle closed.

Figure 3 is a transverse section on line 3—3 of Figure 2 and showing the convolutions slightly extended.

In the drawing, and wherein similar reference characters designate corresponding parts throughout the several views, the letter A designates the handle portion of the device and B the combined receptacle and sifter mounted in one end of the handle A.

The handle A is preferably formed from spring wire coiled midway its ends as at 5 and forming a pair of arms 6 normally urged apart at their free forward ends by the coiled head 5. At the forward end of each arm 6 are angularly offset extensions 7 offset in opposite directions so as to cross one another as clearly shown in Figures 1 and 2. The extensions 7 are offset in a like plane as the plane of the head 5 and preferably bear one upon another in sliding contact. Each arm 6 is provided adjacent its forward end with offsets 8 which may be formed by kinking the wire, and these offsets aside from forming finger dripping portions to be engaged by the thumb and index finger of the hand, also serve as stops for limiting closing movement of the arms 6.

At the outer end of each offset extension 7 are forwardly extending support arms 10 each being formed at its free end with a closed eye 11 the axes of which preferably extend parallel to the axis of the coil 5. The action of the spring coil 5 tends to spread the arms 6 apart and owing to the crossing of the offsets 7 will tend to normally urge the support arms 10 toward one another.

The holder or receptacle B is adapted to be mounted between the support arms 10 and is preferably formed from spring wire coiled into double helical formation substantially in the form of a spiral spring tapering toward each end of the receptacle.

Each terminal coil of the spirally formed receptacle B is formed into an eye 15 and these eyes 15 are intended to be hooked in the eyes 11 of the support arms 10. The helical shaped ends of the receptacle have the convolutions thereof gradually reduced in diameter toward each end of the receptacle whereby when the receptacle is in a closed condition the convolutions will contact with one another for forming a closed chamber 16. This chamber 16 may vary in size and is intended when the receptacle is closed, to contain a predetermined quantity of the material.

By having the receptacle B of double helical formation tapering toward each end of the receptacle with the ends of the conical shaped ends anchored in the support arms 10, pull exerted on the ends of the receptacle will be on a line axially of the receptacle and form an even tension to spread each of the convolutions equally. The conical-shaped ends of the receptacle also eliminate the necessity of providing closure caps at each end of the receptacle.

In use of the device, it is merely necessary to press the arms 6 together for spreading the arms 10 as in Figure 1 which spreads the convolutions of the receptacle providing spaces as at 20 between adjacent convolutions. The receptacle may then be inserted into the material to be handled whereby the material may readily pass thru the spaces 20 into the chamber 16. Pressure may then be released upon the arms 6 whereupon the spring coil head 5 acts to spread the arms and close the convolutions of the receptacle closing the chamber 16. The spring action created by the spring wire forming the receptacle B will also close the spaces 20. As the receptacle is made from cylindrical material the excess material will be readily extended from the chamber 16 during closing of the convolutions. The device may then be transported to the desired place and on exerting a pressure upon the arms 6 the convolutions forming the receptacle may be extended to various degrees to allow sifting the material from the chamber 16 thru a slight vibrating motion by the hand of the operator. Varying of pressure upon the arms 6 will vary the degree of opening between the convolutions of the receptacle and thus regulate the escape of material from the chamber 16. If the device is merely intended for obtaining a measured quantity of the material, and quick release of the material is desired, it will be seen that upon exerting pressure on the arms 6 until the offsets 8 engage one another that the openings 20 between the convolutions will be made relatively large and allow quick escape of the contents from the chamber.

It will be noted that the entire device may be formed from spring wire and constructed very economically owing to the simple formation of the handle and the receptacle.

From the foregoing it will be apparent that an improved combined measuring and sifting device for use in handling pulverized material has been disclosed embodying a yieldable receptacle for the material and which receptacle is of such construction as to be readily extended to various degrees for allowing escape of the material thruout the entire area of the receptacle. It will also be apparent that a novel arrangement has been shown permitting of the combined receptacle and sifter being constructed from spring wire so formed as to form a normally closed chamber for retaining the material while being transported from a supply receptacle to a point of use.

Changes in detail may be made to the form of invention herein shown and described, without departing from the spirit of the invention or the scope of the claims.

I claim:

1. A device of the class described comprising a handle portion embodying a pair of support arms for movement toward and away from one another, and a normally closed expansible receptacle supported at its ends between said arms and adapted to be extended to permit escape of material therefrom upon movement of the arms away from one another.

2. A device of the class described comprising a pair of yieldably connected support arms normally urged toward one another, and a normally closed extensible receptacle supported between said arms and adapted to be extended to permit escape of material therefrom upon movement of the arms away from one another.

3. A device of the class described comprising a pair of yieldably connected support arms normally urged toward one another, and a normally closed spirally formed receptacle supported between said arms and adapted to have the convolutions thereof extended to permit escape of material from the receptacle upon movement of the arms away from one another.

4. A device of the class described comprising a pair of support arms having movement toward and away from one another, and a receptacle of double helical formation supported at its ends between said arms and having the convolutions thereof normally spring urged into contacting engagement.

5. A device of the class described comprising a pair of support arms normally spring urged toward one another, and a sifter supported between said arms formed of spring material spirally formed to provide a chamber normally closed and adapted to be opened thru movement of the support arms away from one another.

6. A device of the class described comprising a handle embodying support arms normally spring urged toward one another, and a measuring receptacle supported between said arms, said receptacle being of double helical formation with the convolutions thereof normally contacting forming a normally closed chamber.

7. In a device of the class described, a receptacle constructed from spring wire in the double helical formation gradually reduced in diameter toward each end of the receptacle, said convolutions normally contacting and forming a closed chamber, and means connected with opposite ends of the receptacle to expand the convolutions thereof to permit escape of the material from the receptacle.

8. A device of the class described comprising a handle embodying a pair of support arms each having an eye at its forward end, means normally spring urging the arms toward one another, and a spirally formed receptacle having the convolutions thereof gradually reduced in diameter toward each end of the receptacle with means for mounting the terminal convolutions of the receptacle in the eyes of said support arms.

9. A device of the class described comprising a handle portion embodying a pair of arms normally spring urged in opposite directions, an offset at the forward end of each arm with the offset of one arm extended across the offset of the companion arm, a support arm at the outer end of each offset, and a normally spring closed extensible receptacle supported at its ends between the support arms.

10. A device of the class described comprising a handle portion embodying a pair of support arms normally spring urged toward one another, said arms each having an eye formed at its free end, and a combined receptacle and sifter formed of spring wire into double helical formation forming a normally closed chamber when the convolutions are in contacting engagement, and an eye formed upon the terminal convolutions for engaging in the eyes of said support arms.

11. In a device of the class described, a receptacle constructed from spring wire to form helical shaped ends with the convolutions thereof normally engaging and forming a closed chamber, a handle including a pair of support arms normally spring urged together, and means connecting the ends of the receptacle to the support arms.

BROR N. CARLSON.